United States Patent [19]

Mizoguchi

[11] Patent Number: 4,908,838
[45] Date of Patent: Mar. 13, 1990

[54] CORRELATION DETECTING CIRCUIT OPERABLE IN A LOW FREQUENCY

[75] Inventor: Shoichi Mizoguchi, Tokyo, Japan

[73] Assignee: NEC Corporation, Tokyo, Japan

[21] Appl. No.: 247,552

[22] Filed: Sep. 22, 1988

[30] Foreign Application Priority Data

Sep. 22, 1987 [JP] Japan .................................. 62-236314

[51] Int. Cl.⁴ ............................................. H04B 3/18
[52] U.S. Cl. ...................................... 375/15; 375/106
[58] Field of Search ....................... 364/724.2; 367/45; 333/18; 375/12, 14, 15, 39

[56] References Cited

U.S. PATENT DOCUMENTS

| 4,453,256 | 6/1984 | Ryu ......................................... 375/15 |
| 4,475,211 | 10/1984 | Mattis, Jr. et al. ..................... 375/15 |
| 4,809,298 | 2/1989 | Sakane et al. .......................... 375/15 |

Primary Examiner—Benedict V. Safourek
Attorney, Agent, or Firm—Sughrue, Mion, Zinn, Macpeak & Seas

[57] ABSTRACT

In an adaptive equalizer system for equalizing, in response to a plurality of controllable tap gains, a received signal carrying a transmission data sequence digitized by a reference clock signal, a correlation detecting circuit (63') comprises a divider (111) for frequency dividing a reproduced clock signal representative of a reproduction of the reference clock signal to produce a divided clock signal. A serial-parallel converter (120) is for converting a reproduced data sequence representative of a reproduction of the transmission data sequence and a digital error signal relative to the reproduced data sequence into a plurality of converted data sequences and a plurality of converted error signals in synchronism the divided clock signal. An Exclusive logic circuit (70) is for carrying out an exclusive logic operation on the converted error signals and the converted data sequences to produce a plurality of correlation signals which are collectively used in controlling the controllable tap gains.

15 Claims, 6 Drawing Sheets

CORRELATION DETECTING CIRCUIT OPERABLE IN A LOW FREQUENCY

BACKGROUND OF THE INVENTION

This invention relates to a correlation detecting circuit for use in an adaptive equalizer system and, more particularly, to a correlation detecting circuit for use in an adaptive equalizer system for a digital radio transmission system.

In general, an adaptive equalizer system of the type described is supplied through a transmission path with a received signal subjected to modulation at a modulation rate. The received signal carries a transmission data sequence digitized by a reference clock signal. The reference clock signal has a reference clock frequency which is equal to the modulation rate. The modulation may be, for example, quadrature amplitude modulation (QAM). The received signal has a waveform subject to a distortion which results from degradation of a characteristic in the transmission path and interruption in the transmission path. The adaptive equalizer system serves to equalize the distortion of the waveform, as well known in the art.

An adaptive equalizer system is disclosed in U.S. Pat. No. 4,453,256 issued to T. Ryu and assigned to the instant assignee. According to Ryu, the adaptive equalizer system comprises a transversal filter for filtering the received signal into an equalized signal in response to a plurality of controllable tap gains and a demodulator for demodulating the equalized signal into a reproduced clock signal, a reproduced data sequence, and a digital error signal. The reproduced clock signal is a reproduction of the reference clock signal. The reproduced data sequence is a reproduction of the transmission data sequence. The digital error signal is related to the reproduced data sequence. The adaptive equalizer system further comprises a gain control circuit responsive to the reproduced clock signal, to the reproduced data sequence, and to the digital error signal for controlling the controllable tap gains by the use of an equalizing algorithm. The equalizing algorithm is, for example, a zero forcing (ZF) algorithm. The gain control circuit comprises a correlation detecting circuit and an integrating circuit.

The correlation detecting circuit comprises a delaying circuit and an Exclusive logic circuit. The delaying circuit is for delaying the reproduced data sequence and the digital error signal to produce a delayed data sequence and a delayed error signal in synchronism with the reproduced clock signal. The delaying circuit comprises a plurality of flip flops. The delayed data sequence, the delayed error signal, the reproduced data sequence, and the digital error signal are supplied to the Exclusive logic circuit as a plurality of input signals. The Exclusive logic circuit is for carrying out an exclusive logic operation on the input signals to produce a plurality of correlation signals which represent cross-correlation between the reproduced data sequence and the digital error signal. The Exclusive logic circuit comprises a plurality of exclusive logic gates. Each of the exclusive logic gates is either an Exclusive OR gate or an Exclusive NOR gate. The integrating circuit is for integrating the correlation signals to produce a plurality of integrated signals as the controllable tap gains.

In general, a conventional correlation detecting circuit is implemented either as an integrated circuit (IC) or a large-scale integrated circuit (LSI). Each of the IC and LSI comprises a plurality of complementary metal oxide semiconductor (CMOS) circuits. This is because each CMOS circuit has a low power consumption. However, the CMOS circuit has a maximum CMOS operation speed which is about thirty-five in terms of megahertz and is lower than that of other circuits, for example, a current mode logic (CML) circuit. Therefore, the conventional correlation detecting circuit can not be used in the adaptive equalizer system supplied with the received signal of the modulation rate which is higher than the maximum CMOS operation speed if the conventional correlation detecting circuit comprises the CMOS circuits. Inasmuch as the adaptive equalizer system is, for example, for four-by-four quadrature amplitude modulation, namely, 16-QAM, and is supplied with the received signal of a bit transfer rate which is equal to two hundreds megabits per second, the modulation rate is equal to fifty megahertz and is higher than the maximum CMOS operation speed. In this case, the conventional correlation detecting circuit must be composed of discrete integrated circuits, each of which comprises a plurality of CML circuits. As a result, the conventional correlation detecting circuit is disadvantageous in that it is impossible to render the conventional correlation detecting circuit compact and that it is impossible to have a low power consumption.

SUMMARY OF THE INVENTION

It is an object of this invention to provide a correlation detecting circuit which can be formed by circuitry comprising CMOS circuits.

It is another object of this invention to provide a correlation detecting circuit of the type described, which is suitable for an adaptive equalizer system in which a modulation rate is higher than a maximum CMOS operation speed.

It is still another object of this invention to provide a correlation detecting circuit of the type described, which can operate without decreasing equalization ability when a zero forcing algorithm is used in producing controllable tap gains in a transversal filter of the adaptive equalizer system.

It is yet another object of this invention to provide a correlation detecting circuit of the type described, wherein it is possible to make the correlation detecting circuit have a small size and a low power consumption.

A correlation detecting circuit to which this invention is applicable is for use in an adaptive equalizer system comprising a transversal filter for filtering a received signal into an equalized signal in response to a plurality of controllable tap gains and a demodulator for demodulating the equalized signal into a reproduced clock signal, a reproduced data sequence, and a digital error signal. The received signal carries a transmission data sequence digitized by a reference clock signal. The reproduced clock signal is a reproduction of the reference clock signal. The reproduced data sequence is a reproduction of the transmission data sequence. The digital error signal is related to the reproduced data sequence. The correlation detecting circuit includes logic operation carrying out means for carrying out an exclusive logic operation on a plurality of input signals derived from the reproduced clock signal, the reproduced data sequence, and the digital error signal to produce a plurality of correlation signals which represent cross-correlation between the reproduced data sequence and the digital error signal and are collectively used in controlling the controllable tap gains. According to this invention, the correlation detecting circuit comprises divider means for frequency dividing the reproduced clock signal to produce a divided clock signal and serial-parallel converting means coupled to the divider means and responsive to the digital error signal and to the reproduced data sequence for converting the digital error signal and the reproduced data sequence into the input signals in synchronism with the divided clock signal.

DESCRIPTION OF THE PREFERRED EMBODIMENTS

Figure 1:
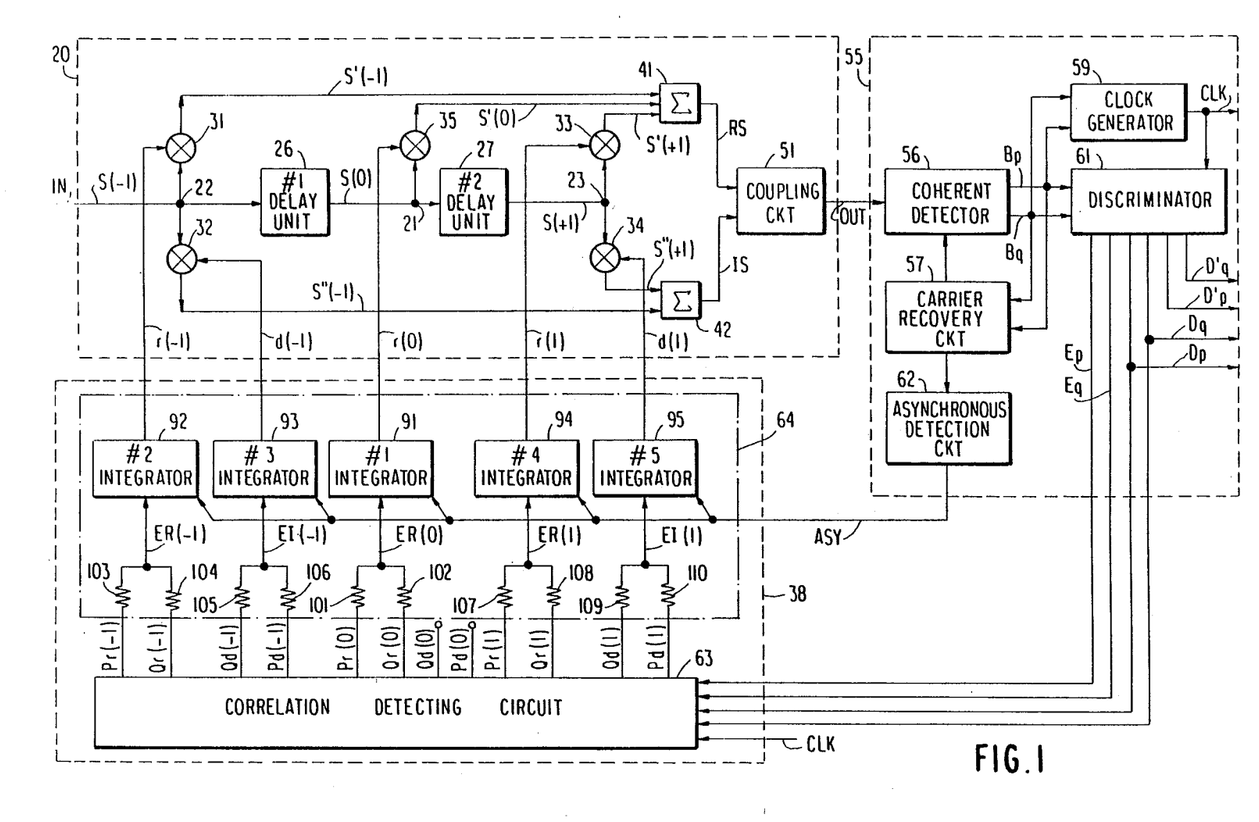
FIG. 1 shows a block diagram of an adaptive equalizer system which this invention is applicable.

Referring to FIG. 1, an adaptive equalizer system will be described at first for a better understanding of this invention. The adaptive equalizer system is supplied with a received signal IN of an intermediate frequency band. The received signal IN is assumed to be subjected to four-by-four quadrature amplitude modulation (16-QAM) at a predetermined modulation rate. The predetermined modulation rate is, for example, equal to fifty megahertz. The received signal IN is modulated by or carries a transmission data sequence digitized by a reference clock signal. The reference clock signal has a reference clock frequency which is equal to the predetermined modulation rate.

The adaptive equalizer system comprises a transversal filter 20 for filtering the received signal IN into an equalized signal OUT in response to a plurality of controllable tap gains which may be specified by $C(-1)$, $C(0)$, and $C(+1)$. The equalized signal OUT is also subjected to four-by-four quadrature amplitude modulation like the received signal IN but is equalized by the transversal filter 20. The illustrated transversal filter 20 has three taps. A central one of the three taps may be called a central or a first tap 21. The remaining ones of the taps are depicted on the lefthand and the righthand sides of the central tap 21 and may be called second and third taps 22 and 23, respectively. The second and the third taps 22 and 23 may be referred to as first and second additional taps.

First and second delay units 26 and 27 are placed between the second and the first taps 22 and 21 and between the first and the third taps 21 and 23, respectively. Each of the first and the second delay units 26 and 27 provides a delay which is substantially equal to a reciprocal of the modulation rate. The received signal IN is delivered to the second tap 22 as a first one of additional tap signals and successively delayed by the first and the second delay units 26 and 27 to be produced as a central tap signal and a second additional tap signal which are sent to the first and the third taps 21 and 23, respectively.

Let the second, the first, and the third taps 22, 21, and 23 be specified by consecutive numbers of $(-1)$, 0, and $(+1)$, respectively, taking the successive delays into consideration. In this connection, the first additional tap signal appearing as the $(-1)$ tap 22 may be specified by $S(-1)$. Likewise, the central and the second additional tap signals may be specified by $S(0)$ and $S(+1)$, respectively.

Inasmuch as the received signal IN is subjected to the quadrature amplitude modulation as mentioned before, the received signal IN includes an in-phase and a quadrature phase component. The in-phase and the quadrature phase components are individually processed with reference to the central tap signal $S(0)$. More specifically, the first additional tap signal $S(-1)$ is delivered to a first in-phase multiplier 31 and a first quadrature multiplier 32. The second additional tap signal $S(+1)$ is delivered to a second in-phase multiplier 33 and a second quadrature multiplier 34 in a manner to be described later. The central tap signal $S(0)$ is given to a central in-phase multiplier 35 alone because no quadrature phase component is present in the central tap signal $S(0)$. Each of the multipliers 31 to 35 may be referred to as a weighting circuit.

The controllable tap gains $C(0)$, $C(-1)$, and $C(+1)$ are produced by a gain control circuit 38 as will later be described in detail. The controllable tap gains $C(0)$, $C(-1)$, and $C(+1)$ may be referred to as a central complex control signal, first and second complex control signals, respectively. The central complex control signal $C(0)$ consists of a real part alone and is therefore represented by $r(0)$ in FIG. 1. On the other hand, each of the first and the second complex control signals $C(-1)$ and $C(+1)$ consists of a real part and an imaginary part represented by r and d, respectively. In FIG. 1, the first complex control signal $C(-1)$ is specified by a combination of $r(-1)$ and $d(-1)$ while the second complex control signal $C(+1)$, a combination of $r(1)$ and $d(1)$.

As shown in FIG. 1, the real and the imaginary parts $r(-1)$ and $d(-1)$ of the first complex control signal $C(-1)$ are delivered from the gain control circuit 38 to the first in-phase and the first quadrature multipliers 31 and 32, respectively. Likewise, the real and the imaginary parts $r(1)$ and $d(1)$ of the second complex control signal $C(+1)$ are delivered to the second in-phase and the second quadrature multipliers 33 and 34, respectively. The central complex control signal $C(0)$ or $r(0)$ is sent to the central in-phase multiplier 35 in a usual manner.

The first in-phase and the first quadrature multipliers 31 and 32 supply first and second adders 41 and 42 with a first controlled in-phase component $S'(-1)$ and a first controlled quadrature component $S''(-1)$, respectively. The second in-phase and the second quadrature multipliers 33 and 34 supply the first and the second adders 41 and 42 with a second controlled in-phase component and a second controlled quadrature component which are represented by $S'(+1)$ and $S''(+1)$, respectively. Each of the first and the second in-phase components may be named a first controlled signal while each of the first and the second quadrature components is named a second controlled signal. A central controlled in-phase component S'(0) is sent from the central in-phase multiplier 35 to the first adder 41.

The first and the second adders 41 and 42 carry out addition to produce an in-phase signal RS and a quadrature signal IS representative of results of the addition, respectively. The in-phase and the quadrature signals RS and IS may be called first and second processed signals, respectively. In this connection, the first and the second adders 41 and 42 may be referred to as first and second processing circuits, respectively. The in-phase and the quadrature signals RS and IS are combined together by a coupling circuit 51 into a coupled signal with a quadrature phase relation kept between the in-phase and the quadrature signals RS and IS. The coupled signal is sent as the equalized signal OUT to a demodulator 55.

The demodulator 55 comprises a coherent detector 56 responsive to the equalized signal OUT and to a recovered carrier wave supplied from a carrier recovery circuit 57. The coherent detector 56 carries out coherent detection with reference to the recovered carrier wave to produce a demodulated baseband signal. The demodulated baseband signal consists of an in-phase and a quadrature component represented by Bp and Bq, respectively. The in-phase and the quadrature components Bp and Bq have an in-phase and a quadrature level, respectively. Responsive to the in-phase and the quadrature components Bp and Bq of the baseband signal, a clock generator 59 delivers a reproduced clock signal CLK to both of the gain control circuit 38 and a discriminator 61. The reproduced clock signal CLK is a reproduction of the reference clock signal. The discriminator 61 produces a reproduced data sequence D. The reproduced data sequence is a reproduction of the transmission data sequence. The reproduced data sequence D consists of in-phase data components Dp and D'p and of quadrature data components Dq and D'q. The in-phase data components Dp and D'p represent the in-phase level of the in-phase component Bp of the demodulated baseband signal. Likewise, the quadrature data components Dq and D'q represent the quadrature level of the quadrature component Bq of the demodulated baseband signal. The discriminator 61 also produces a digital error signal E. The digital error signal E is related to the reproduced data sequence D. The digital error signal E consists of an in-phase and a quadrature error component Ep and Eq which correspond to the in-phase and the quadrature data components Dp and Dq, respectively. Such a discriminator 61 may be a decision circuit described in the above-referenced United States patent and will therefore not be described any longer.

The carrier recovery circuit 57 additionally produces the recovered carrier wave in response to the in-phase and the quadrature components Bp and Bq of the demodulated baseband signal. The carrier recovery circuit 57 is coupled to an asynchronous detection circuit 62. The asynchronous detection circuit 62 monitors the carrier recovery circuit 57 to detect an asynchronous state of the equalizer and to produce an asynchronous state signal ASY representative of the asynchronous state when the asynchronous detection circuit 62 detects the asynchronous state.

The in-phase and the quadrature error components Ep and Eq of the digital error signal E and the in-phase and the quadrature data components Dp and Dq of the reproduced data sequence D are delivered from the demodulator 55 to the gain control circuit 38 together with the reproduced clock signal CLK and the asynchronous state signal ASY.

Responsive to the reproduced clock signal CLK, to the in-phase and the quadrature error components Ep and Eq of the digital error signal E, and to the in-phase and the quadrature data components Dp and Dq of the reproduced data sequence D, the gain control circuit 38 controls the controllable tap gains C(j) by the use of a zero forcing (ZF) algorithm where j represents a tap number, such as 0, (−1), and (+1). It will be assumed that a k-th time is prior to a (k+1)-th time (k+1) by a repetition period of the reproduced clock signal CLK. According to the zero forcing algorithm, controllable tap gains C(j, k+1) at the (k+1)-th time (k+1) are decided by a combination of a digital error signal E(k) at the k-th time k, a reproduced data sequence D(k−j) at a (k−j)-th time (k−j), and controllable tap gains C(j, k) at the k-th time k as follows:

$$C(j, k + 1) = \tag{1}$$

$$C(j, k) - \Delta \left[ sgn \left\{ \sum_{k=1}^{H} D^*(k - j) \times E(k) \right\} \right]$$

$$C(j, k) = r(j)(k) + id(j)(k) \tag{2}$$
$$E(k) = Ep(k) + iEq(k) \tag{3}$$
$$D^*(k - j) = Dp(k - j) - iDq(k - j) \tag{4}$$

where $\Delta$ represents a fixed incremental step size, i represents an imaginary unit which is equal $\sqrt{-1}$, to the notation "sgn" represents a polarity of the argument enclosed with a pair of braces, H represents a positive integer.

The controllable tap gains C(j, k+1) have real and imaginary parts r(j, k+1) and d(j, k+1) which are given by:

$$r(j, k + 1) = r(j, k) - \tag{5}$$

$$\Delta \left[ sgn \left\{ \sum_{k=1}^{H} (Ep(k) \oplus Dp(k - j) + Eq(k) \oplus Dq(k - j)) \right\} \right]$$

$$d(j, k + 1) = d(j, k) - \tag{6}$$

$$\Delta \left[ sgn \left\{ \sum_{k=1}^{H} (Eq(k) \oplus Dq(k - j) + Ep(k) \odot Dq(k - j)) \right\} \right]$$

where the symbol $\oplus$ is used as an Exclusive-OR operator and the symbol $\odot$ is used as an Exclusive-NOR operator.

The gain control circuit 38 comprises a correlation detecting cicuit 63 and an integrating circuit 64. The correlation detecting circuit 63 is for finding out cross-correlation between the reproduced data sequence D(m) and the digital error signal E(m) to produce a plurality of correlation signals. The integrating circuit 64 is for integrating the correlation signals to produce a plurality of integrated signals as the controllable tap gains C(j).

Figure 2:
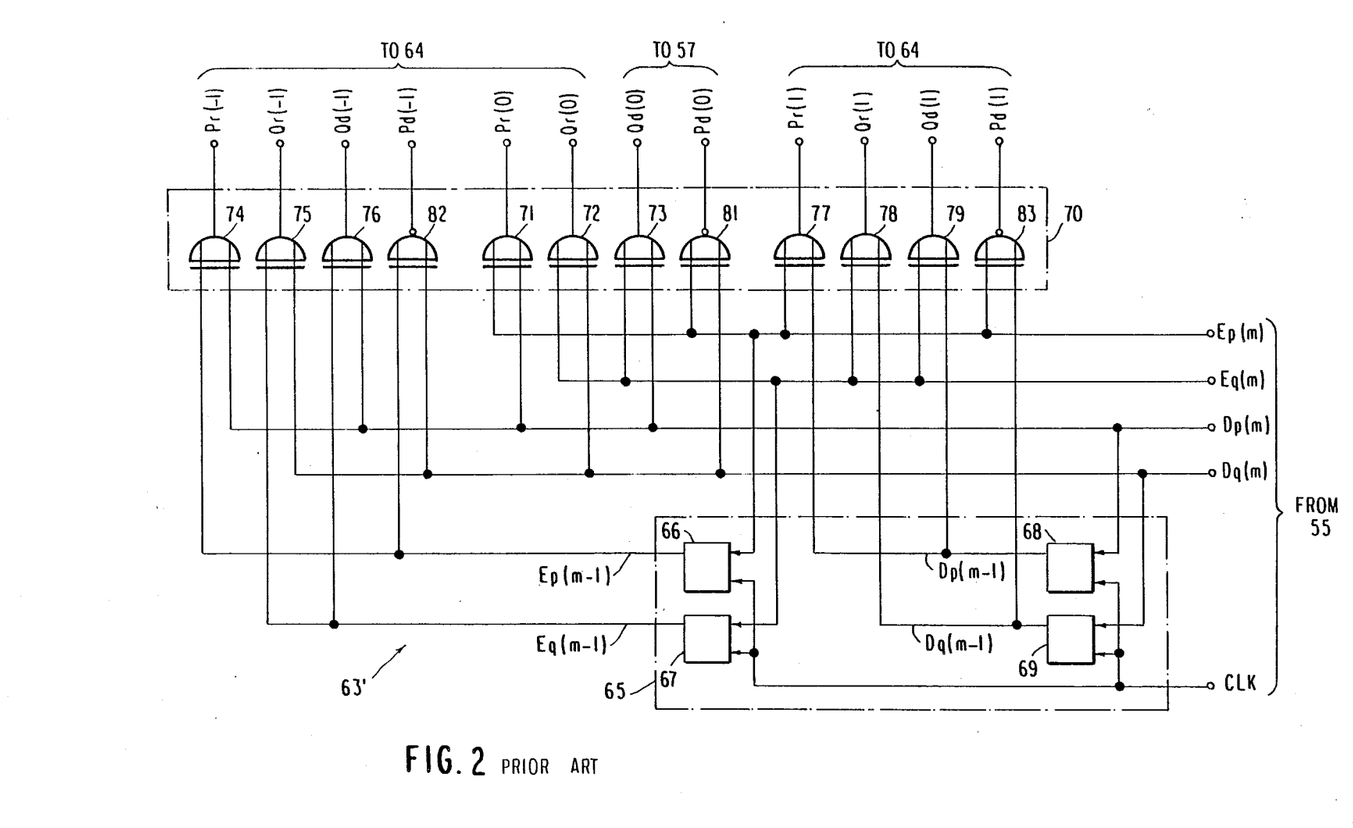
FIG. 2 shows a block diagram of a conventional correlation detection circuit.

Referring to FIG. 2, a conventional correlation detecting circuit 63' will be described for a better understanding of this invention. The illustrated correlation detecting circuit 63' comprises a delaying circuit 65 and an Exclusive logic circuit 70. The delaying circuit 65 is for delaying the reproduced data sequence D(m) and the digital error signal E(m) to produce a delayed data sequence D(m−1) and a delayed error signal E(m−1)

in synchronism with the reproduced clock signal CLK. The delayed data sequence D(m−1) and the delayed error signal E(m−1) are delayed by one repetition period of the reproduced clock signal CLK relative to the reproduced data sequence D(m) and the digital error signal E(m), respectively. More particularly, the delaying circuit 65 comprises first through fourth flip flops 66, 67, 68, and 69. The delayed clock signal CLK is delivered to the flip flops 66 through 69. The first flip flop 66 is for delaying an in-phase error component Ep(m) of the digital error signal E(m) to produce a delayed in-phase error component Ep(m−1) of the delayed error signal E(m−1) in synchronism with the reproduced clock signal CLK. Likewise, the second flip flop 67 is for delaying a quadrature error component Eq(m) of the digital error signal E(m) to produce a delayed quadrature error component Eq(m−1) of the delayed error signal E(m−1) in synchronism with the reproduced clock signal CLK. The third and the fourth flip flop 68 and 69 are for delaying in-phase and quadrature data components Dp(m) and Dq(m) of the reproduced data sequence D(m) to produce delayed in-phase and delayed quadrature data components Dp(m−1) and Dq(m−1) of the delayed data sequence D(m−1), respectively, in synchronism with the reproduced clock signal CLK.

The delayed data sequence D(m−1), the delayed error signal E(m−1), the reproduced data sequence D(m), and the digital error signal E(m) are supplied to the Exclusive logic circuit 70 as a plurality of input signals. The Exclusive logic circuit 70 is for carrying out an exclusive logic operation on the input signals to produce the correlation signals. The Exclusive logic circuit 70 comprises first through ninth Exclusive-OR gates 71, 72, 73, 74, 75, 76, 77, 78, and 79, and first through third Exclusive-NOR gates 81, 82, and 83. More particularly, the first Exclusive-OR gate 71 carries out an exclusive OR operation on the in-phase error component Ep(m) and the in-phase data component Dp(m) to produce a first correlation signal Pr(0). Therefore, the first correlation signal Pr(0) is given by:

$$Pr(0) = Ep(m) \oplus Dp(m).$$

Similarly, the second Exclusive-OR gate 72 carries out an exclusive OR operation on the quadrature error component Eq(m) and the quadrature data component Dq(m) to produce a second correlation signal Qr(0). The second correlation signal Qr(0) is given by:

$$Qr(0) = Eq(m) \oplus Dq(m).$$

Likewise, the third Exclusive-OR gate 73 carries out an exclusive OR operation on the quadrature error component Eq(m) and the in-phase data component Dp(m) to produce a third correlation signal Qd(0). The third correlation signal Qd(0) is given by:

$$Qd(0) = Eq(m) \oplus Dp(m).$$

The first Exclusive-NOR gate 81 carries out an exclusive NOR operation on the in-phase error component Ep(m) and the quadrature data component Dq(m) to produce a fourth correlation signal Pd(0). The fourth correlation signal Pd(0) is given by:

$$Pd(0) = Ep(m) \odot Dq(m).$$

In this manner, fourth, the fifth, and the sixth Exclusive-OR gates 74, 75, and 76, and the second Exclusive-NOR gate 82 produce fifth, sixth, seventh, and eighth correlation signals Pr(−1), Qr(−1), Qd(−1), and Pd(−1) which are given by:

$$Pr(-1) = Ep(m-1) \oplus Dp(m),$$
$$Qr(-1) = Eq(m-1) \oplus Dq(m),$$
$$Qd(-1) = Eq(m-1) \oplus Dp(m),$$
$$\text{and } Pd(-1) = Ep(m-1) \odot Dq(m).$$

Similarly, the seventh, the eighth, and the ninth Exclusive-OR gates 77, 78, and 79, and the third Exclusive-NOR gate 83 produce ninth, tenth, eleventh, and twelfth correlation signals Pr(1), Qr(1), Qd(1), and Pd(1) which are given by:

$$Pr(1) = Ep(m) \oplus Dp(m-1),$$
$$Qr(1) = Eq(m) \oplus Dq(m-1),$$
$$Qd(1) = Eq(m) \oplus Dp(m-1),$$
$$\text{and } Pd(1) = Ep(m) \odot Dq(m-1).$$

The correlation signals except for the third and the fourth correlation signals Qd(0) and Pd(0) are supplied to the integrating circuit 64.

Although the in-phase and the quadrature components Bp and Bq of the demodulated baseband signal are supplied to the carrier recovery circuit 57 as mentioned above, the in-phase and the quadrature components Bp and Bq of the demodulated baseband signal may not be always supplied to the carrier recovery circuit 57. In this case, the third and the fourth correlation signals Qd(0) and Pd(0) is used instead of the in-phase and the quadrature components Bp and Bq of the demodulated baseband signal.

Turning back to FIG. 1, the integrating circuit 64 comprises first through fifth resettable integrators 91, 92, 93, 94, and 95. The first resettable integrator 91 is coupled through first and second registers 101 and 102 to the first and the second Exclusive-OR gates 71 and 72. Similarly, the second resettable integrator 92 is coupled through third and fourth registers 103 and 104 to the fourth and the fifth Exclusive-OR gates 74 and 75. The third resettable integrator 93 is coupled through fifth and sixth registers 105 and 106 to the sixth Exclusive-OR gate 76 and the second Exclusive-NOR gate 82. The fourth resettable integrator 94 is coupled through seventh and eighth registers 107 and 108 to the seventh and eighth Exclusive-OR gates 77 and 78. The fifth resettable integrator 95 is coupled through ninth and tenth registers 109 and 110 to the ninth Exclusive-OR gate 79 and the third Exclusive-NOR gate 83.

A pair of the first and the second registers 101 and 102 are for combining the first correlation signal Pr(0) and the second correlation signal Qr(0) to produce a first combined signal ER(0). Therefore, the first combined signal ER(0) is given by:

$$\begin{aligned} ER(0) &= Pr(0) + Qr(0) \\ &= Ep(m) \oplus Dp(m) + Eq(m) \oplus Dq(m). \end{aligned}$$

Similarly, another pair of the third and the fourth registers 103 and 104 are for combining the fourth correlation signal Pr(−1) and the fifth correlation signal Qr(−1) to produce a second combined signal ER(−1) which is given by:

$$ER(-1) = Pr(-1) + Qr(-1)$$
$$= Ep(m - 1) \oplus Dp(m) + Eq(m - 1) \oplus Dq(m).$$

In this manner, pairs of the fifth and the sixth registers 105 and 106, the seventh and the eighth registers 107 and 108, and the ninth and the tenth registers 109 and 110 produce third, fourth, and fifth combined signals EI(−1), ER(1), and EI(1), respectively, which are given by:

$$ER(-1) = Qd(-1) + Pd(-1)$$
$$= Eq(m - 1) \oplus Dp(m) + Ep(m - 1) \odot Dq(m),$$
$$ER(1) = Pr(1) + Qr(1)$$
$$= Ep(m) \oplus Dp(m - 1) + Eq(m) \oplus Dq(m - 1),$$
and
$$EI(1) = Qd(1) + Pd(1)$$
$$= Eq(m) \oplus Dp(m - 1) + Ep(m) \odot Dq(m - 1).$$

The first through the fifth resettable integrators 91 to 95 are coupled to the asynchronous detecting circuit 62. When the asynchronous state signal ASY is given from the asynchronous detecting circuit 62 to the first through the fifth resettable integrators 91 to 95, the first resettable integrators 91 is reset into a logic "1" level and is kept at the logic "1" level. Each of the remaining integrators 92 to 95 is reset into a logic "0" level. In the absence of the asynchronous state signal ASY, each of the integrators 91 to 95 works out a time average of each combined signal ER(0), ER(−1), EI(−1), ER(1), and EI(1) to remove an unnecessary noise component from each combined signal. Anyway, the first through the fifth integrators 92 to 95 produce the controllable tap gains C(0), C(−1), and C(+1).

The first through the tenth registers 101 to 110 are for use in combining each pair of the correlation signals as mentioned above. However, OR gates may be used instead of the first through the tenth registers 101 to 110.

It will be understood that the controllable tap gains C(0), C(−1), and C(+1) are determined by the zero forcing algorithm given by Equation (1).

As mentioned before, the conventional correlation detecting circuit 63' operates in synchronism with the reproduced clock signal CLK. The reproduced clock signal CLK has a clock frequency which is equal to the modulation rate. Therefore, the conventional correlation detecting circuit 63' is disadvantageous as pointed out heretobefore.

Figure 3:
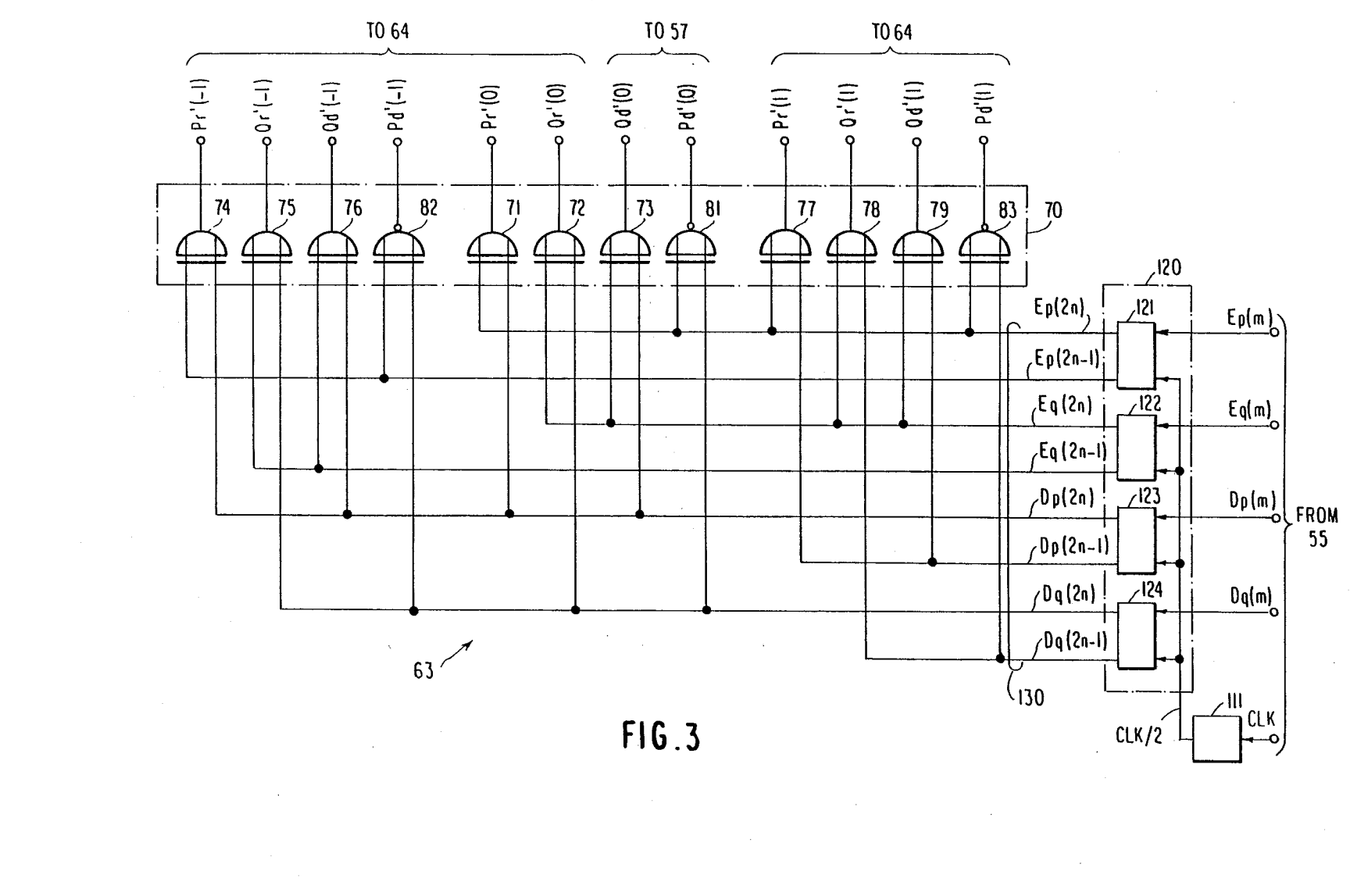
FIG. 3 shows a block diagram of a correlation detection circuit according to a first embodiment of this invention.

Referring to FIG. 3, the correlation detecting circuit 63 according to a first embodiment of this invention comprises similar parts designated by like reference numerals. The illustrated correlation detecting circuit 63 is for use in the adaptive equalizer system as shown in FIG. 1.

The illustrated correlation detecting circuit 63 comprises a divider 111 for frequency dividing the reproduced clock signal CLK by a factor ½. The divider 111 produces a divided clock signal CLK/2. The divided clock signal CLK/2 has a divided clock frequency which is equal to a half of the clock frequency. The divider 111 is coupled to a serial-parallel converter 120 supplied with the digital error signal E(m) and the reproduced data sequnce D(m). The serial-parallel converter 120 is for converting the digital error signal E(m) and the reproduced data sequence D(m) into first and second converted error signals E(2n) and E(2n−1) and first and second converted data sequences D(2n) and D(2n−1) in synchronism with the divided clock signal CLK/2. The first and the second converted error signals E(2n) and E(2n−1) and the first and the second converted data sequences D(2n) and D(2n−1) are delivered through lines 130 to the Exclusive logic circuit 70 collectively as the input signals. The lines 130 act as a supplying arrangement for supplying the converted error signals and the converted data sequences to the Exclusive logic circuit 70.

More specifically, the serial-parallel converter 120 comprises first through fourth serial-parallel converting units 121, 122, 123, and 124. The first serial-parallel converting unit 121 is for converting the in-phase error component Ep(m) of the digital error signal E(m) into first and second parallel in-phase error components Ep(2n) and Ep(2n−1) in synchronism with the divided clock signal CLK/2. The second serial-parallel converting unit 122 is for converting the quadrature error component Eq(m) of the digital error signal E(m) into first and second parallel quadrature error components Eq(2n) and Eq(2n−1) in synchronism with the divided clock signal CLK/2. The first and the second parallel in-phase error components Ep(2n) and Ep(2n−1) are delivered through the lines 130 to the Exclusive logic circuit 70 as converted in-phase error components of the first and the second converted error signals E(2n) and E(2n−1). Similarly, the first and the second parallel quadrature error components Eq(2n) and Eq(2n−1) are delivered through the lines 130 to the Exclusive logic circuit 70 as the converted quadrature error components of the first and the second converted error signals E(2n) and E(2n−1). The first and the second serial-parallel converting units 121 and 122 will be called in-phase and quadrature error serial-parallel converting arrangements, respectively.

Likewise, the third serial-parallel converting unit 123 is for converting the in-phase data component Dp(m) of the reproduced data sequence D(m) into first and second parallel in-phase data components Dp(2n) and Dp(2n−1) in synchronism with the divided clock signal CLK/2. The fourth serial-parallel converting unit 124 is for converting the quadrature data component Dq(m) of the reproduced data sequence D(m) into first and second parallel quadrature data components Dq(2n) and Dq(2n−1) in synchronism with the divided clock signal CLK/2. The first and the second parallel in-phase data components Dp(2n) and Dp(2n−1) are delivered through the lines 130 to the Exclusive logic circuit 70 as converted in-phase data components of the first and the second converted data sequences D(2n) and D(2n−1). Similarly, the first and the second parallel quadrature data components Dq(2n) and Dq(2n−1) are delivered through the lines 130 to the Exclusive logic circuit 70 as converted quadrature data components of the first and the second converted data sequences D(2n) and D(2n−1). The third and the fourth serial-parallel converting units 123 and 124 will be called in-phase and quadrature data serial-parallel converting arrangements, respectively.

Figure 4:
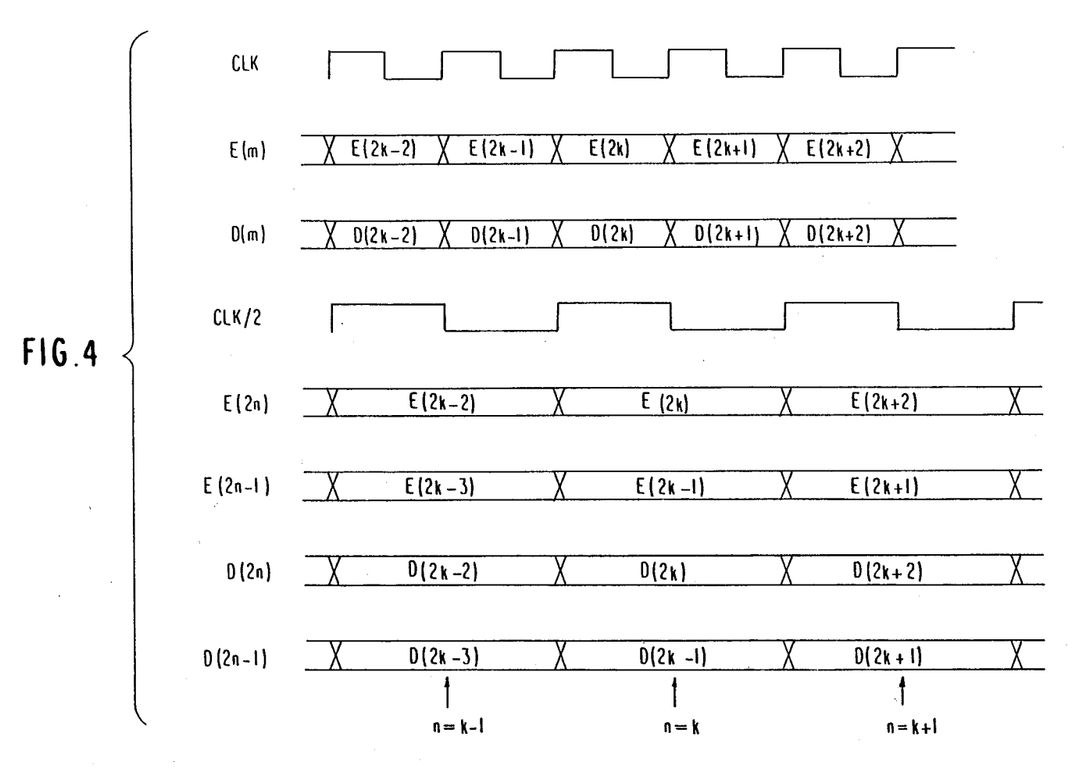
FIG. 4 shows a time chart for use in describing an operation which is carried out by a serial-parallel converter in the correlation detection circuit illustrated in 3.

Referring to FIG. 4, the reproduced clock signal CLK is indicated along a first or top line. Second and third lines show the digital error signal E(m) and the reproduced data sequence D(m), respectively. The divided clock signal CLK/2 is indicated along a fourth line. Fifth through eighth lines show the first and the second converted error signals E(2n) and E(2n−1) and the first and the second converted data sequences D(2n) and D(2n−1)

The digital error signal E(m) comprises a series of error elements such as a (2k−1)-th error element E(2k−1) of a (2k−1)-th time slot (2k−1), a 2k-th error element E(2k) of a 2k-th time slot 2k, a (2k+1)-th error element E(2k+1) of a (2k+1)-th time slot (2k+1), where k represents an integer. Similarly, the reproduced data sequence D(m) comprises a series of data elements such as a (2k−1)-th data element D(2k−1) of the (2k−1)-th time slot (2k−1), a 2k-th data element D(2k) of the 2k-th time slot 2k, a (2k+1)-th data element D(2k+1) of the (2k+1)-th time slot (2k+1).

The first converted error signal E(2n) comprises a series of converted error elements having time slots each of which is equal in number to an even number such as a (2k−2)-th error element E(2k−2) of a (2k−2)-th time slot (2k−2), the 2k-th error element E(2k) of the 2k-th time slot 2k, a (2k+2)-th error element E(2k+2) of a (2k+2)-th time slot (2k+2). Similarly, the second converted error signal E(2n−1) comprises a series of converted error elements having time slots each of which is equal in number to an odd number such as a (2k−3)-th error element E(2k−3) of a (2k−3)-th time slot (2k−3), the (2k−1)-th error element E(2k−1) of the (2k−1)-th time slot (2k−1), the (2k+1)-th error element E(2k+1) of the (2k+1)-th time slot (2k+1). Likewise, the first converted data sequence D(2n) comprises a series of converted data elements having time slots each of which is equal in number to the even number such as a (2k−2)-th data element D(2k−2) of the (2k−2)-th time slot (2k−2), the 2k-th data element D(2k) of the 2k-th time slot 2k, a (2k+2)-th data element D(2k+2) of the (2k+2)-th time slot (2k+2). The second converted data sequence D(2n−1) comprises a series of converted data elements having time slots each of which is equal in number to the odd number such as a (2k−3)-th data element D(2k−3) of the (2k−3)-th time slot (2k−3), the (2k−1)-th data element D(2k−1) of the (2k−1)-th time slot (2k−1), the (2k+1)-th data element D(2k+1) of the (2k+1)-th time slot (2k+1).

The converted in-phase error component Ep(2n) of the first converted error signal E(2n) is supplied to the first and the seventh Exclusive-OR gates 71 and 77 and the first and the third Exclusive-NOR gates 81 and 83. The converted in-phase error component Ep(2n−1) of the second converted error signal E(2n−1) is supplied to the fourth Exclusive-OR gate 74 and the second Exclusive-NOR gate 82. The converted quadrature error component Eq(2n) of the first converted error signal E(2n) is supplied to the second, the third, the eighth, and the ninth Exclusive-OR gates 72, 73, 78, and 79. The converted quadrature error component Eq(2n−1) of the second converted error signal E(2n−1) is supplied to the fifth and the sixth Exclusive-OR gates 75 and 76. Likewise, the converted in-phase data component Dp(2n) of the first converted data sequence D(2n) is supplied to the first, the third, the fourth, and the sixth Exclusive-OR gates 71, 73, 74, and 76. The converted in-phase data component Dp(2n−1) of the second converted data sequence D(2n−1) is supplied to the seventh and the ninth Exclusive-OR gates 77 and 79. The converted quadrature data component Dq(2n) of the first converted data sequence D(2n) is supplied to the second and the fifth Exclusive-OR gates 72 and 75 and the first and the second Exclusive-NOR gates 81 and 82. The converted quadrature data component Dq(2n−1) of the second converted data sequence D(2n−1) is supplied to the eighth Exclusive-OR gate 78 and the third Exclusive-NOR gate 83.

Therefore, the first through the third Exclusive-OR gates 71 to 73 and the first Exclusive-NOR gate 81 produce first through fourth correlation signals P'r(0), Q'r(0), Q'd(0), and P'd(0) which are given by:

$P'r(0) = Ep(2n) \oplus Dp(2n)$, $Q'r(0) = Eq(2n) \oplus Dq(2n)$, $Q'd(0) = Eq(2n) \oplus Dp(2n)$, and $P'd(0) = Ep(2n) \odot Dq(2n)$.

Similarly, the fourth through the sixth Exclusive-OR gates 74 to 76 and the second Exclusive-NOR gate 82 produce fifth through eighth correlation signals P'r(−1), Q'r(−1), Q'd(−1), and P'd(−1) which are given by:

$P'r(-1) = Ep(2n-1) \oplus Dp(2n)$, $Q'r(-1) = Eq(2n-1) \oplus Dq(2n)$, $Q'd(-1) = Eq(2n-1) \ Dp(2n)$, and $P'd(-1) = Ep(2n-1) \odot Dq(2n)$.

Likewise, the seventh through the ninth Exclusive-OR gates 77 to 79 and the third Exclusive-NOR gate 83 produce ninth through twelfth correlation signals P'r(1), Q'r(1), Q'd(1), and P'd(1) which are given by:

$P'r(1) = Ep(2n) \oplus Dp(2n-1)$, $Q'r(1) = Eq(2n) \oplus Dq(2n-1)$, $Q'd(1) = Eq(2n) \oplus Dp(2n-1)$, and $P'd(1) = Ep(2n) \odot Dp(2n-1)$.

When the correlation detecting circuit 63' is used instead of the correlation detecting circuit 63' as shown in FIG. 2, the gain control circuit 38 produces controllable tap gains C(j, k+1) given by:

$$C(j, k+1) = C(j, k) - \Delta \left[ \text{sgn} \left\{ \sum_{k=1}^{H'} D^*(2k-j) \times E(2k) \right\} \right] \quad (1')$$

where H' represents a positive integer.

If the positive integer H' is large, the second term of the right side of Equation (1') is nearly equal to that of Equation (1). The positive integer H' corresponds to a time constant of the integrating circuit 64. The time constant is generally long.

The illustrated correlation detecting circuit 63 has an operation speed which is equal to the divided clock frequency except for the divider 111. If the operation speed is not higher than a maximum CMOS operation speed, the correlation detecting circuit 63 can be formed, except for the divider 111, by an LSI consisting of CMOS circuits. Accordingly, it is possible to make the correlation detecting circuit 63 have a small size and a low power consumption.

Description will proceed to a more general circuit structure of the correlation detecting circuit 63. It will be assumed that the transversal filter has K taps where K represents a predetermined positive integer which is equal to (2M+1) where M represents a first predetermined natural number. In this connection, the divider 111 is for dividing the reproduced clock signal CLK by a factor 1/N where N represents a second predetermined natural number which is not less than the first predetermined natural number M plus one. The serial-parallel converter 120 produces first through L-th converted error signals and first through L-th converted data sequences where L represents a third predetermined natural number which is equal to the second predetermined natural number N. It will be also assumed that the demodulator 55 produces an in-phase and a quadrature error component of the digital error signal, and an in-phase and a quadrature component of the reproduced data sequence. In this case, the Exclusive logic circuit 70 comprises a plurality of exclusive logic gates which are equal in number to four times the predetermined positive integer K. Each of the exclusive logic gates is responsive to a selected one of converted in-phase and quadrature error components of the converted error signals and to a selected one of converted in-phase and quadrature data components of the converted data sequences for producing a selected one of the correlation signals.

Figure 5:
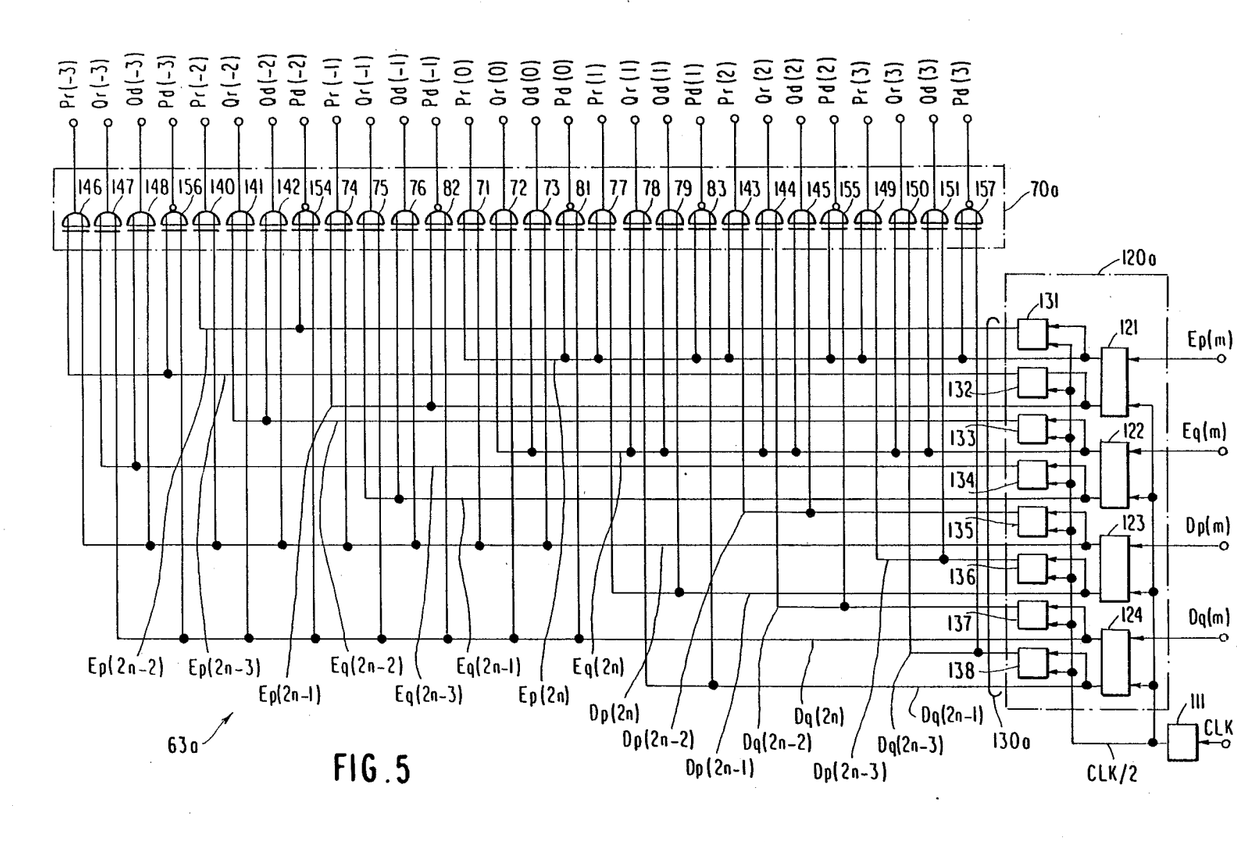
FIG. 5 shows a block diagram of a correlation detection circuit according to a second embodiment of this invention.

Referring to FIG. 5, a correlation detecting circuit 63a according to a second embodiment of this invention comprises similar parts designated by like reference numerals. The illustrated correlation detecting circuit 63a is for use in the adaptive equalizer system in which the transversal filter has seven taps.

The correlation detecting circuit 63a comprises a serial-parallel converter 120a coupled to the divider 111 and supplied with the digital error signal E(m) and the reproduced data sequence D(m). The serial-parallel converter 120a is for converting the digital error signal E(m) and the reproduced data sequence D(m) into first through fourth converted error signals E(2n), E(2n−1), E(2n−2), and E(2n−3) and first through fourth converted data sequences D(2n), D(2n−1), D(2n−2), and D(2n−3) in synchronism with the divided clock signal CLK/2. The first through the fourth converted error signals E(2n) to E(2n−3) and the first through the fourth converted data sequences D(2n) to D(2n−3) are delivered through lines 130a to an Exclusive logic circuit 70a collectively as the input signals.

More specifically, the serial-parallel converter 120a comprises first through eighth flip flops 131, 132, 133, 134, 135, 136, 137, and 138 in addition to the first through the fourth serial-parallel converting units 121 to 124. The first and the second flip flops 131 and 132 are coupled to the first serial-parallel converting unit 121 for delaying the first and the second parallel in-phase error components Ep(2n) and Ep(2n−1) to produce first and second delayed in-phase error components Ep(2n−2) and Ep(2n−3) in synchronism with the divided clock signal CLK/2, respectively. The first and the second flip flops 131 and 132 will be called in-phase error delaying arrangement. The first and the second parallel in-phase error components Ep(2n) and Ep(2n−1) and the first and second delayed in-phase error components Ep(2n−2) and Ep(2n−3) are delivered through the lines 130a to the Exclusive logic circuit 70a as converted in-phase error components of the first through the fourth converted error signals E(2n) to E(2n−3). Similarly, the third and the fourth flip flops 133 and 134 are coupled to the second serial-parallel converting unit 122 for delaying the first and the second parallel quadrature error components Eq(2n) and Eq(2n−1) to produce first and second delayed quadrature error components Eq(2n−2) and Eq(2n−3) in synchronism with the divided clock signal CLK/2, respectively. The third and the fourth flip flops 133 and 134 will be called quadrature error delaying arrangement. The first and the second parallel quadrature error components Eq(2n) and Eq(2n−1) and the first and second delayed quadrature error components Eq(2n−2) and Eq(2n−3) are delivered through the lines 130a to the Exclusive logic circuit 70a as converted quadrature error components of the first through the fourth converted error signals E(2n) to E(2n−3).

Likewise, the fifth and the sixth flip flops 135 and 136 are coupled to the third serial-parallel converting unit 123 for delaying the first and the second parallel in-phase data components Dp(2n) and Dp(2n−1) to produce first and second delayed in-phase data components Dp(2n−2) and Dp(2n−3) in synchronism with the divided clock signal CLK/2, respectively. The fifth and the sixth flip flops 135 and 136 will be called in-phase data delaying arrangement. The first and the second parallel in-phase data components Dp(2n) and Dp(2n−1) and the first and the second delayed in-phase data components Dp(2n−2) and Dp(2n−3) are delivered through the lines 130a to the Exclusive logic circuit 70a as converted in-phase data components of the first through the fourth converted data sequences D(2n) to D(2n−3). The seventh and the eighth flip flops 137 and 138 are coupled to the fourth serial-parallel converting unit 124 for delaying the first and the second parallel quadrature data components Dq(2n) and Dq(2n−1) to produce first and second delayed quadrature data components Dq(2n−2) and Dq(2n−3) in synchronism with the divided clock signal CLK/2, respectively. The seventh and the eighth flip flops 137 and 138 will be called a quadrature data delaying arrangement. The first and the second parallel quadrature data components Eq(2n) and Eq(2n−1) and the first and the second delayed quadrature data components Eq(2n−2) and Eq(2n−3) are delivered through the lines 130a to the Exclusive logic circuit 70a as converted quadrature data components of the first through the fourth converted data sequences D(2n) to D(2n−3). At any rate, the serial-parallel converter 120a produces the first through the fourth converted error signals E(2n) to E(2n−3) and the first through the fourth converted data sequences D(2n) to D(2n−3).

The Exclusive logic circuit 70a comprises tenth through twenty-first Exclusive-OR gates 140, 141, 142, 143, 144, 145, 146, 147, 148, 149, 150, and 151 and fourth through seventh Exclusive-NOR gates 154, 155, 156, and 157 in addition to the first through the ninth Exclusive-OR gates 71 to 79 and the first through the third Exclusive-NOR gates 81 to 83.

Table 1 shows combinations of the first through the fourth converted error signals E(2n) to E(2n−3) and the first through the fourth converted data sequences D(2n) to D(2n−3) in order to obtain controllable tap gains C(0), C(−1), C(−2), C(−3), C(1), C(2), and C(3). In Table 1, numbers 0, (−1), (−2), (−3), 1, 2, and 3 represent tap numbers. Description will presently be made as regards the numbers enclosed with circles.

TABLE 1

| E(m) | D(2n) | D(2n-1) | D(2n-2) | D(2n-3) |
|---|---|---|---|---|
| E(2n)   | ⓪  | ①  | ②  | ③ |
| E(2n-1) | -1 | 0  | 1  | 2 |
| E(2n-2) | -2 | -1 | 0  | 1 |
| E(2n-3) | -3 | -2 | -1 | 0 |

The Exclusive logic circuit 70a produces first through twenty-eighth correlation signals in accordance with specific combinations enclosed by the circles in the combinations. More particularly, the first through the third Exclusive-OR gates 71 to 73 and the first Exclusive-NOR gate 81 produce the first through the fourth correlation signals Pr(0), Qr(0), Qd(0), and Pd(0) which are given by:

$Pr(0) = Ep(2n) \oplus Dp(2n)$, $Qr(0) = Eq(2n) \oplus Dq(2n)$, $Qd(0) = Eq(2n) \oplus Dp(2n)$, and $Pd(0) = Ep(2n) \odot Dq(2n)$ The fourth through the sixth Exclusive-OR gates 74 to 76 and the second Exclusive-NOR gate 82 produce the fifth through the eighth correlation signals $Pr(-1)$, $Qr(-1)$, $Qd(-1)$, and $Pd(-1)$ which are given by:

$Pr(-1) = Ep(2n-1) \oplus Dp(2n)$, $Qr(-1) = Eq(2n-1) \oplus Dq(2n)$, $Qd(-1) = Eq(2n-1) \oplus Dp(2n)$, and $Pd(-1) = Ep(2n-1) \odot Dq(2n)$ The seventh through the ninth Exclusive-OR gates 77 to 79 and the third Exclusive-NOR gate 83 produce the ninth through the twelfth correlation signals Pr(1), Qr(1), Qd(1), and Pd(1) which are given by:

$Pr(1) = Ep(2n) \oplus Dp(2n-1)$, $Qr(1) = Eq(2n) \oplus Dq(2n-1)$, $Qd(1) = Eq(2n) \oplus Dp(2n-1)$, and $Pd(1) = Ep(2n) \odot Dq(2n-1)$.

The tenth through the twelfth Exclusive-OR gates 140 to 142 and the fourth Exclusive-NOR gate 154 produce the thirteenth through the sixteenth correlation signals $Pr(-2)$, $Qr(-2)$, $Qd(-2)$, and $Pd(-2)$ which are given by:

$Pr(-2) = Ep(2n-2) \oplus Dp(2n)$, $Qr(-2) = Eq(2n-2) \oplus Dq(2n)$, $Qd(-2) = Eq(2n-2) \oplus Dp(2n)$, and $Pd(-2) = Ep(2n-2) \odot Dg(2n)$.

The thirteenth through the fifteenth Exclusive-OR gates 143 to 145 ad the fifth Exclusive-NOR gate 155 produce the seventeenth through the twentieth correlation signals Pr(2), Qr(2), Qd(2), and Pd(2) which are given by:

$Pr(2) = Ep(2n) \oplus Dp(2n-2)$, $Qr(2) = Eq(2n) \oplus Dq(2n-2)$, $Qd(2) = Eq(2n) \oplus Dp(2n-2)$, and $Pd(2) = Ep(2n) \odot Dq(2n-2)$.

The sixteenth through the eighteenth Exclusive-OR gates 146 to 148 and the sixth Exclusive-NOR gate 156 produce the twenty-first through the twenty-fourth correlation signals $Pr(-3)$, $Qr(-3)$, $Qd(-3)$, and $Pd(-3)$ which are given by:

$Pr(-3) = Ep(2n-3) \oplus Dp(2n)$, $Qr(-3) = Eq(2n-3) \oplus Dq(2n)$, $Qd(-3) = Eq(2n-3) \oplus Dp(2n)$, and $Pd(-3) = Ep(2n-3) \odot Dq(2n)$.

The nineteenth through the twenty-first Exclusive-OR gates 149 to 151 and the seventh Exclusive-NOR gate 157 produce the twenty-fifth through the twenty-eighth correlation signals Pr(3), Qr(3), Qd(3), and Pd(3) which are given by:

$Pr(3) = Ep(2n) \oplus Dp(2n-3)$, $Qr(3) = Eq(2n) \oplus Dq(2n-3)$, $Qd(3) = Eq(2n) \oplus Dp(2n-3)$, and $Pd(3) = Ep(2n) \odot Dq(2n-3)$.

Other combinations are possible. For example, a combination of the second converted error signal $E(2n-1)$ and the second converted data sequence $D(2n-1)$ is used instead of that of the first converted error signal $E(2n)$ and the first converted data sequence $D(2n)$ in order to obtain the controllable tap gain C(0). In this case, the first through the third Exclusive-OR gates 71 to 72 and the first Exclusive-NOR gate 81 produce the first through the fourth correlation signals Pr(0), Qr(0), Qd(0), and Pd(0) which are given by equations:

$Pr(0) = Ep(2n-1) \oplus Dp(2n-1)$, $Qr(0) = Eq(2n-1) \oplus Dq(2n-1)$, $Qd(0) = Eq(2n-1) \oplus Dp(2n-1)$, and $Pd(0) = Ep(2n-1) \odot Dq(2n-1)$.

Figure 6:
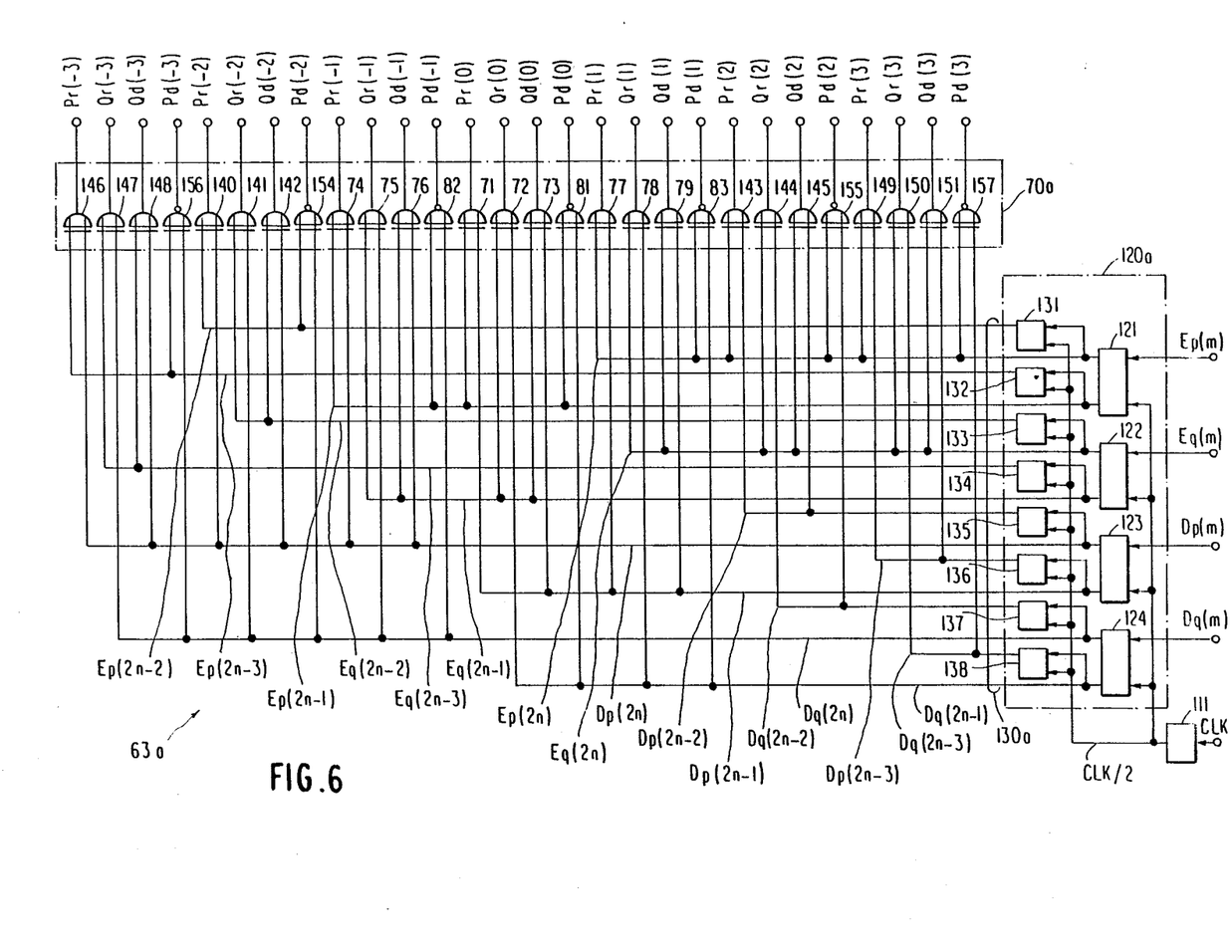
FIG. 6 shows a block diagram of a modified correlation detection circuit into which the correlation detection circuit illustrated in FIG. 5 is modified.

In FIG. 6, a modified correlation detecting circuit 63'a is shown which is given by modifying the correlation detecting circuit 63a in accordance with the equations related to the first through the fourth correlation signals Pr(0), Qr(0), Qd(0), and Pd(0).

Description will proceed to another general circuit structure of the correlation detecting circuit 63a. It will be assumed that the transversal filter has K taps where K represents a predetermined positive integer which is equal to (2M+1) where M represents a first predetermined natural number. In this case, the divider 111 is for frequency dividing the reproduced clock signal CLK by a factor 1/N where N represents a second predetermined natural number which is less than two. The serial-parallel converter 120a produces first through L-th converted error signals and first through L-th converted data sequences where L repesents a third predetermined natural number which is not less than the first predetermined natural number M plus one. It will also be assumed that the demodulator 55 produces an in-phase and a quadrature error component of the digital data signal, and an in-phase and a quadrature error component of the reproduced data sequence. In this case, the Exclusive logic circuit 70a comprises a plurality of exclusive logic gates which are equal in number to four times the predetermined positive integer K. Each of the exclusive logic gates is responsive to a selected one of converted in-phase and quadrature error coponents of the converted error signals and to a selected one of converted in-phase and quadrature data components of the converted data sequences for producing a selected one of the correlation signals.

While this invention has thus far been described in conjunction with several preferred embodiments thereof, it will readily be possible for those skilled in the art to put this invention into practice in various other manners. For example, this invention is also applicable to a transversal filter which is supplied with the in-phase and the quadrature components Bp and Bq of the above-mentioned demodulated baseband signal instead of the above-mentioned received signal IN of the intermediate frequency band.

What is claimed is:

1. A correlation detecting circuit for use in an adaptive equalizer system comprising a transversal filter for filtering a received signal into an equalized signal in response to a plurality of controllable tap gains and a demodulator for demodulating said equalized signal into a reproduced clock signal, a reproduced data sequence, and a digital error signal, said received signal carrying a transmission data sequence digitized by a reference clock signal, said reproduced clock signal being a reproduction of said reference clock signal, said reproduced data sequence being a reproduction of said transmission data sequence, said digital error signal being related to said reproduced data sequence, said correlation detecting circuit including logic operation carrying out means for carrying out an exclusive logic operation on a plurality of input signals derived from said reproduced clock signal, said reproduced data sequence, and said digital error signal to produce a plurality of correlation signals which represent cross-correlation between said reproduced data sequence and said digital error signal and are collectively used in controlling said controllable tap gains, wherein the improvement comprises:
divider means for frequency dividing said reproduced clock signal to produce a divided clock signal; and
serial-parallel converting means coupled to said divider means and responsive to said digital error signal and to said reproduced data sequence for converting said digital error signal and said reproduced data sequence into said input signals in synchronism with said divided clock signal.

2. A correlation detecting circuit as claimed in claim 1, wherein said serial-parallel converting means comprises:
error serial-parallel converting means for converting said digital error signal into a plurality of converted error signals in synchronism with said divided clock signal;
data serial-parallel converting means for converting said reproduced data sequence into a plurality of converted data sequences in synchronism with said divided clock signal; and
supplying means for supplying said converted error signals and said converted data sequences to said logic operation carrying out means collectively as said input signals.

3. A correlation detecting circuit as claimed in claim 2, wherein:
said error serial-parallel converting means comprises:
an error serial-parallel converting unit for converting said digital error signal into a plurality of parallel error signals in synchronism with said divided clock signal; and
error delaying means for delaying said parallel error signals to produce a plurality of delayed error signals in synchronism with said divided clock signal;
said data serial-parallel converting means comprising:
a data serial-parallel converting unit for converting said reproduced data sequence into a plurality of parallel data sequences in synchronism with said divided clock signal; and
data delaying means for delaying said parallel data sequence to produce a plurality of delayed data sequences in synchronism with said divided clock signal;
said supplying means supplying said parallel error signals, said delayed error signals, said parallel data sequences, and said delayed data sequences to said logic operation carrying out means collectively as said input signals.

4. A correlation detecting circuit as claimed in claim 2, said transversal filter having K taps where K represents a predetermined positive integer which is equal to $(2M+1)$ where M represents a first predetermined natural number, wherein said divider means comprises a divider for frequency dividing said reproduced clock signal by a factor $1/N$ where N represents a second predetermined natural number which is not less than said first predetermined natural number plus one.

5. A correlation detecting circuit as claimed in claim 4, wherein said converted error signals comprise first through L-th converted error signals, said converted data sequences comprising first through L-th converted data sequences where L represents a third predetermined natural number which is equal to said second predetermined natural number.

6. A correlation detecting circuit as claimed in claim 2, said transversal filter having K taps where K represents a predetermined positive integer which is equal to $(2M+1)$ where M represents a first predetermined natural number, wherein said divider means comprises a divider for frequency dividing said reproduced clock signal by a factor $1/N$ where N represents a second predetermined natural number which is not less than two.

7. A correlation detecting circuit as claimed in claim 6, wherein said converted error signals comprise first through L-th converted error signals, said converted data sequences comprising first through L-th converted data sequences where L represents a third predetermined natural number which is not less than said first predetermined natural number plus one.

8. A correlation detecting circuit as claimed in claim 2, said demodulator producing an in-phase and a quadrature error component of said digital error signal, an in-phase and a uuadrature data component of said reproduced data sequence, wherein:
said error serial-parallel converting means comprises:
in-phase error serial-parallel converting means for converting said in-phase error component into a plurality of converted in-phase error components in synchronism with said divided clock signal; and quadrature error serial-parallel converting means for converting said quadrature error component into a plurality of converted quadrature error components in synchronism with said divided clock signal;

said data serial-parallel converting means comprising:

in-phase data serial-parallel converting means for converting said in-phase data component into a plurality of converted in-phase data components in synchronism with said divided clock signal; and quadrature data serial-parallel converting means for converting said quadrature data component into a plurality of converted quadrature data components in synchronism with said divided clock signal;

said supplying means supplying said converted in-phase and quadrature error components and said converted in-phase and quadrature data components to said logic operation carrying out means collectively as said input signals.

9. A correlation detecting circuit as claimed in claim 8, wherein:

said in-phase error serial-parallel converting means comprises:

an in-phase error serial-parallel converting unit for converting said in-phase error component into a plurality of parallel in-phase error components in synchronism with said divided clock signal; and in-phase error delaying means for delaying said parallel in-phase error components to produce a plurality of delayed in-phase error components in synchronism with said divided clock signal;

said quadrature error serial-parallel converting means comprising:

a quadrature error serial-parallel converting unit for converting said quadrature error component into a plurality of parallel quadrature error components in synchronism with said divided clock signal; and quadrature error delaying means for delaying said parallel quadrature error components to produce a plurality of delayed quadrature error components in synchronism with said divided clock signal;

said in-phase data serial-parallel converting means comprising:

an in-phase data serial-parallel converting unit for converting said in-phase data component into a plurality of parallel in-phase data components in synchronism with said divided clock signal; and in-phase data delaying means for delaying said parallel in-phase data components to produce a plurality of delayed in-phase data components in synchronism with said divided clock signal;

said quadrature data serial-parallel converting means comprising:

a quadrature data serial-parallel converting unit for converting said quadrature data component into a plurality of parallel quadrature data components in synchronism with said divided clock signal; and quadrature data delaying means for delaying said parallel quadrature data components to produce a plurality of delayed quadrature data components in synchronism with said divided clock signal;

said supplying means supplying said parallel in-phase error components, said delayed in-phase error components, said parallel quadrature error components, said delayed quadrature error components, said parallel in-phase data components, said delayed in-phase data components, said parallel quadrature data components, and said delayed quadrature data components to said logic operation carrying out means collectively as said input signals.

10. A correlation detecting circuit as claimed in claim 8, said transversal filter having K taps where K represents a predetermined positive integer which is equal to $(2M+1)$ where M represents a first predetermined natural number, wherein said divider means comprises a divider for frequency dividing said reproduced clock signal by a factor $1/N$ where N represents a second predetermined natural number which is not less than said first predetermined natural number plus one.

11. A correlation detecting circuit as claimed in claim 10, wherein said converted in-phase error components comprise first through L-th converted in-phase error components, said converted quadrature error components comprising first through L-th converted quadrature error components, said converted in-phase data components comprising first through L-th converted in-phase data components, said converted quadrature data components comprising first through L-th converted quadrature data components where L represents a third predetermined natural number which is equal to said second predetermined natural number.

12. A correlation detecting circuit as claimed in claim 10, wherein said logic operation carrying out means comprises a plurality of exclusive logic gates which are equal in number to four times said predetermined positive integer, each of said exclusive logic gates being responsive to a selected one of said converted in-phase and quadrature error components and to a selected one of said converted in-phase and quadrature data components for producing a selected one of said correlation signals.

13. A correlation detecting circuit as claimed in claim 8, said transversal filter having K taps where K represents a predetermined positive integer which is equal to $(2M+1)$ where M represents a first predetermined natural number, wherein said divider means comprises a divider for frequency dividing said reproduced clock signal by a factor $1/N$ where N represents a second predetermined natural number which is not less than two.

14. A correlation detecting circuit as claimed in claim 13, wherein said converted in-phase error components comprise first through L-th converted in-phase error components, said converted quadrature error components comprising first through L-th converted quadrature error components, said converted in-phase data components comprising first through L-th converted in-phase data components, said converted quadrature data components comprising first through L-th converted quadrature data components where L represents a third predetermined natural number which is not less than said first predetermined natural number plus one.

15. A correlation detecting circuit as claimed in claim 13, wherein said logic operation carrying out means comprises a plurality of exclusive logic gates which are equal in number to four times said predetermined positive integer, each of said exclusive logic gates being responsive to a selected one of said converted in-phase and quadrature error components and to a selected one of said converted in-phase and quadrature data components for producing a selected one of said correlation signals.

* * * * *

UNITED STATES PATENT AND TRADEMARK OFFICE
CERTIFICATE OF CORRECTION

PATENT NO. : 4,908,838
DATED : March 13, 1990
INVENTOR(S) : Shoichi MIZOGUCHI

It is certified that error appears in the above-identified patent and that said Letters Patent is hereby corrected as shown below:

Col. 9, line 15, delete "ER" and insert --EI--;

line 67, delete "sequnce" and insert --sequence--.

Col. 12, line 28, after "(2n-1)" insert --⊕--.

Col. 18, line 64, delete "uuadrature" and insert --quadrature--.

Signed and Sealed this

Ninth Day of July, 1991

Attest:

HARRY F. MANBECK, JR.

Attesting Officer

Commissioner of Patents and Trademarks